United States Patent [19]

Lawson et al.

[11] Patent Number: 5,086,122
[45] Date of Patent: Feb. 4, 1992

[54] CROSSLINKED CHLORINATED POLYVINYL CHLORIDE RESIN COMPOSITIONS

[75] Inventors: Dennis L. Lawson, Brunswick; Robert E. Detterman, Elyria, both of Ohio

[73] Assignee: The B. F. Goodrich Company, Akron, Ohio

[21] Appl. No.: 637,394

[22] Filed: Jan. 4, 1991

Related U.S. Application Data

[62] Division of Ser. No. 197,730, May 23, 1988, Pat. No. 4,983,687.

[51] Int. Cl.$^5$ ................................. C08F 8/22
[52] U.S. Cl. ........................... 525/235; 525/239; 525/329.5; 525/329.6; 525/331.2; 525/331.6
[58] Field of Search ............... 525/329.5, 322.6, 331.2, 525/331.6, 235, 239

[56] References Cited

U.S. PATENT DOCUMENTS

| | | | |
|---|---|---|---|
| 3,100,762 | 8/1963 | Shockney | 525/331.6 |
| 3,230,203 | 1/1966 | Kuhne | 526/322 |
| 3,415,797 | 12/1968 | Borsini et al. | 526/338 |
| 3,496,253 | 2/1970 | Hamilton et al. | 525/306 |
| 3,535,220 | 10/1970 | Kato et al. | 525/331.6 |
| 3,652,733 | 3/1972 | Davonport | 525/306 |
| 3,736,240 | 5/1973 | Weintraub | 525/331.6 |
| 3,763,123 | 10/1973 | Waterman et al. | 526/338 |
| 3,808,173 | 4/1974 | Orihashi | 525/331.6 |
| 4,006,126 | 2/1977 | Rettore et al. | 525/331.6 |
| 4,031,061 | 6/1977 | Thomas | 525/306 |
| 4,039,732 | 8/1977 | Schoen et al. | 525/331.6 |
| 4,049,517 | 9/1977 | Adachi et al. | 525/331.6 |

*Primary Examiner*—Bernard Lipman
*Attorney, Agent, or Firm*—Joe A. Powell; William F. Prout; Thoburn T. Dunlap

[57] ABSTRACT

Chlorinated polyvinyl chloride resins when crosslinked have improved melt strength in comparison with non-crosslinked chlorinated polyvinyl chloride resins. Moreover, the crosslinked chlorinated polyvinyl chloride resins have unexpected improved processing properties such as reduced processing torgue in comparison with crosslinked polyvinyl chloride resins which upon crosslinking exhibit increased processing torque. Various amounts of non-crosslinked chlorinated polyvinyl chloride and/or non-crosslinked polyvinyl chloride which does not affect said improved properties can be blended with the cross-linked chlorinated polyvinyl chloride resins.

16 Claims, No Drawings

CROSSLINKED CHLORINATED POLYVINYL CHLORIDE RESIN COMPOSITIONS

This is a division, of application Ser. No. 07/197,730, filed 05/23/88, now U.S. Pat. No. 4,983,687.

FIELD OF THE INVENTION

The present invention relates to compositions containing crosslinked chlorinated polyvinyl chloride (CPVC) resins which have unexpectedly been found to have lower melt temperatures than non-crosslinked CPVC resins and hence have favorable properties such as reduced processing torque, and the like. Blends of such resins with non-detrimental amounts of non-crosslinked CPVC (i.e. adverse affect on the processing properties) can also be utilized.

BACKGROUND

Heretofore, CPVC resins have been produced and utilized in applications wherein good chemical resistance, good flame retardancy, and good high heat distortion properties were desirable. However, CPVC is generally difficult to process and requires streamlined equipment. That is, the equipment generally could not have any dead or lull spots therein inasmuch as heat buildup would occur with subsequent undesirable dehydrohalogenation of the resin. Since CPVC resins generally require processing at high temperatures, such dead or lull spots would act as a catalyst and generally impair the entire resin subsequently produced if such spots were not eliminated. If the molecular weight of the CPVC was reduced, the CPVC resin would have low cohesiveness and a tendency to adhere to metal parts such as the extruding or die equipment. Lower molecular weight moreover resulted in a more fluid resin which often would flow into undesired and undesigned portions of the extruding equipment.

Polyvinyl chloride (PVC) resins when cross-linked have been found to have increased torque with regard to processing the same. Hence, it was unexpected that crosslinked chlorinated polyvinyl chloride (CPVC) resins would have reduced processing torque.

SUMMARY OF THE INVENTION

It is therefore an aspect of the present invention to provide a composition of a crosslinked chlorinated polyvinyl chloride resin which has good melt strength and yet improved processing properties such as reduced melt temperatures and reduced torque processing requirements. The crosslinked CPVC resin is desirably produced by crosslinking PVC and subsequently chlorinating the same such that from about 58 percent to about 70 percent by weight of the crosslinked copolymer is chlorine. The polyvinyl chloride resin can generally be polymerized according to conventional processing techniques such as suspension, emulsion, or mass polymerization. The amount of crosslinking agent is an effective amount to yield a suitable processing torque reduction such as at least a 5 or 10 percent reduction in working torque, and the like. Often various amounts of non-crosslinked CPVC and/or non-crosslinked PVC can be utilized which do not adversely affect the processing properties of the crosslinked CPVC resin.

DETAILED DESCRIPTION OF THE INVENTION

According to the present invention, compositions containing crosslinked chlorinated polyvinyl chloride polymers and copolymers thereof are prepared according to any conventional process. Although polyvinyl chloride homopolymers are preferred, copolymers thereof can also be utilized. The copolymer is made by polymerizing vinyl chloride monomer with a vinyl component monomer. By the term "vinyl component," it is meant a vinyl type monomer other than vinyl chloride. Such monomers are well known to the art and to the literature and include esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, including halogenated diolefins such as chloroprene; monoolefins having from 2 to 10 carbon atoms and preferably 2 to 4 carbon atoms; and the like; and mixtures of any of the above types of monomers and other vinyl monomers copolymerizable therewith known to the art and to the literature. An amount of vinyl chloride monomer is utilized to produce a copolymer containing from about 70 to about 95 percent by weight, and preferably from about 80 to about 93 percent by weight of vinyl chloride repeating units therein. The remainder of the copolymer is made up of the one or more above-noted vinyl component monomers, for example, vinyl acetate. Thus, an amount of vinyl component monomer when utilized to produce a copolymer is from about 5 to about 30 percent and preferably from about 7 to about 20 percent by weight of vinyl component repeating units therein.

The crosslinked polyvinyl chloride polymers or copolymers of the present invention can generally be made according to any process route such as suspension polymerization, bulk polymerization, emulsion polymerization, mass polymerization, and the like, with mass polymerization generally being preferred. Such polymerization methods are well known to the art as well as to the literature.

It is an important aspect of the present invention that the chlorinated polyvinyl chloride resin be crosslinked. Desirably, the vinyl chloride copolymer and the preferred vinyl chloride homopolymer are initially crosslinked before any chlorination thereof. That is, before any chlorinated process step, polyvinyl chloride or copolymers thereof are crosslinked. It is to be understood that a less preferred route is to chlorinate such polymers or copolymers and subsequently crosslink the same. Regardless of the particular process, the polymers or copolymers, whether or not chlorinated can be crosslinked in any conventional manner including those known to the art and to the literature. Generally, a difunctional crosslinking agent is utilized. The crosslinking agents which are suitable to produce the crosslinked PVC used in this invention and contain two or more terminal polymerizable $CH_2=C<$ groups per molecule. Examples of this class of materials include polyunsaturated—hydrocarbons, —polyethers, —polyesters, —nitriles, —acids, —acid anhydrides, —ketones, —alcohols and polyunsaturated compounds of this class incorporating one or more of these and other functional groups. Specifically, there may be utilized divinyl benzene, divinyl naphthalene, low-molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters such as ethylene glycol diacrylate, ethylene glycol dimethacrylate, allyl acrylate, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl polyethers containing from two to seven or more of these or other alkenyl ether groupings per molecule and made from polyhydric alcohols such as the carbohydrate sugars, and the so-called "sugar alcohols," including erythritol, pentaerythritol, arabitol, iditol, mannitol, sorbitol, inositol, raffinose, glucose, sucrose, and many others, and other polyhydroxy carbohydrate derivatives, the corresponding polyalkenyl silanes, such as the vinyl and allyl silanes, and others. Of this large class of crosslinking agents, the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and other like, with a strongly alkaline solution of one or more of the polyhydroxy carbohydrate derivatives. Diallyl phthalate and divinyl benzene are preferred.

The crosslinking agent can be added to the polymerization medium in any manner known to those skilled in the art; such as premixing with the vinyl monomer before charging, charging directly into the polymerization medium or metering into the reaction during the polymerization. The preferred method is to first premix the crosslinking agent with the vinyl monomer before charging to the reaction vessel. If a mass polymerization is used to produce the crosslinked PVC polymer, then the crosslinking agent can be added at any location in the process such as the prepolymerizer or the autoclave and preferably in the prepolymerizer.

The amount of crosslinking agent utilized is an effective amount to impart unexpectedly improved processing properties when the crosslinked polymer or copolymer is subsequently chlorinated, or to blends thereof, especially reduced melt temperatures and reduced processing torque. By the term "processing torque," it is meant the torque required for a specific operation, that is, the torque required to perform a particular extruding operation, injection molding operation, profile extrusion, and the like. An effective amount of a crosslinking agent is such which generally reduces the processing or working torque required for a particular operation generally by at least 5 percent as from about 5 percent to about 20 percent and preferably by at least 10 percent as from about 10 percent to about 15 percent. Naturally, the amount of torque reduction will generally vary with the particular type of processing equipment utilized. The amount of such crosslinking agents will vary depending upon the type of crosslinking agents and the like. Generally, to obtain the above-noted reductions in processing torque, the amount of crosslinking agent is generally from about 0.025 to about 5.0 parts by weight, desirably from about 0.1 to about 2.0 parts by weight, and preferably from about 0.1 to about 0.5 parts by weight for every 100 parts by weight of the vinyl chloride monomer or the vinyl chloride monomer and comonomer, which is to be chlorinated or has previously been chlorinated. It is to be understood that when blends are utilized, the non-crosslinked chlorinated polyvinyl chloride and the non-crosslinked polyvinyl chloride are added to the crosslinked chlorinated polyvinyl chloride after the crosslinked chlorinated polyvinyl chloride has been made.

The polyvinyl chloride homopolymer or copolymer of the present invention can be chlorinated in any conventional manner as well as according to any manner known to the art and to the literature so that it contains high amounts of chlorine therein, as for example from about 57 or 58 percent by weight to about 70 percent by weight and preferably from about 65 percent by weight to about 69 percent by weight based upon the total weight of the polyvinyl chloride homopolymer or copolymer. One convenient method of chlorinating either the crosslinked or the non-crosslinked vinyl chloride polymers or copolymers of the present invention is to place the polymers or copolymers in a water slurry containing chlorine therein and activating the same as with ultraviolet light so that the chlorine is added to the polymer chain.

Another aspect of the present invention relates to the utilization of blends of the crosslinked CPVC resin of the present invention with non-crosslinked CPVC resins in amounts which do not adversely affect the processing properties, for example the processing torque reduction, of the present invention. Generally, from about 0 percent to about 85 percent by weight, desirably from about 0 percent to about 50 percent, and preferably from about 0 percent to about 25 percent by weight of non-crosslinked CPVC resins can be utilized based upon the total weight of the non-crosslinked and the crosslinked CPVC resins. Additionally, non-crosslinked PVC resin can be blended with the crosslinked CPVC resins of the present invention. The amount of non-crosslinked PVC resin is from about 0 to about 40 parts by weight, and preferably from about 0 to about 25 parts by weight per 100 parts by weight of said crosslinked CPVC resin or said blend of said crosslinked CPVC resin and said non-crosslinked CPVC resin.

The crosslinked CPVC resins or blends thereof of the present invention can contain common amounts of additives known to the art and to the literature. Such conventional amounts are generally small, that is often less than 10 parts by weight and preferably less than 5 parts by weight of any particular additive based upon 100 parts by weight of the crosslinked CPVC resin or blends thereof. Examples of the various conventional additives which can be utilized include stabilizers, for example the various tin stabilizers such as a tin thioglycolate, various impact modifiers such as chlorinated polyethylene, acrylic based impact modifiers, and the like, various lubricants such as oxidized polyethylene wax, various pigments such as titanium dioxide, and the like. Such additives are well known to the CPVC art.

As noted above, the use of crosslinked CPVC polymers or blends thereof result in unexpected improvements in processing properties. That is, crosslinked CPVC has improved melt strength (cohesive strength). Heretofore problems such as dead spots, heat buildup areas and sticking to hot metal and degradation, that is dehydrochlorination, are abated or completely eliminated. The resulting increase in cohesive strength allows for use of a lower apparent intrinsic viscosity resin which fuses easier and flows at a lower melt temperature. In other words, the same melt strength as non-crosslinked chlorinated polyvinyl chloride resins can be obtained by utilizing the resins of the present invention with the additional advantages that such resins of the present invention have lower melt temperatures, or reduced processing torque, or both.

The crosslinked CPVC resins of the present invention, or blends thereof, can be utilized wherever conventional CPVC resins have heretofore been utilized as in profile extrusion. Areas of specific utility include pipes, skylights, window glazing beads, and the like.

The invention will be better understood by reference to the following examples.

EXAMPLES

Formula 1 relates to a control, that is a non-crosslinked CPVC composition whereas formulas 2 and 3 relate to the crosslinked CPVC compositions of the present invention.

| CROSSLINKED CPVC EVALUATION | | | |
|---|---|---|---|
| | 1 | 2 | 3 |
| RECIPE, PHR | | | |
| CPVC 1.1 IV, 68.5 percent chlorine) | 100 | — | — |
| Crosslinked CPVC (0.9 Apparent IV 68 percent chlorine) | — | 100 | — |
| Crosslinked CPVC (0.74 Apparent IV 68 percent chlorine) | — | — | 100 |
| Dibutyl Tin Bis Isooctyl | 2 | 2 | 2 |

| -continued | | | |
|---|---|---|---|
| CROSSLINKED CPVC EVALUATION | | | |
| | 1 | 2 | 3 |
| Thioglycolate | — | — | — |
| Tyrin 3611, a chlorinated polyethylene, manufactured by Dow Chemical Co. | 4 | 4 | 4 |
| Paraloid KM-330, an acrylic impact modifier, manufactured by Rohm & Haas | 4 | 4 | 4 |
| AC 629A an oxidized polyethylene manufactured by Allied Signal | 1.125 | 1.125 | 1.125 |
| Titanium Dioxide (pigment) | 5 | 5 | 5 |
| RESULTS | | | |
| DTS (410° F.) | | | |
| Time, Minutes | 12.8 | 14.9 | 19.3 |
| Torque, Meter-Grams | 2710 | 2100 | 2100 |
| Temperature, °F. | 224 | 223 | 225 |
| Izod, ft-lbs/in (⅛ inch, notched) | 1.33 | 0.49 | 0.58 |
| Vicat, °C. (Method B) | 131 | 132 | 132 |
| HDT, °F. (⅛ inch, 264 psi) | 217 | 212 | 217 |
| VHIT, in-lbs/mil (⅛ inch tup) | 1.17 | 0.72 | — |
| Tensile, psi | 7977 | 8140 | — |
| Tensile Modulus, psi | 336,000 | 335,333 | — |
| % Elongation | 70% | 23% | — |

As apparent from the above data, most of the physical properties obtained by compounds 2 and 3 of the present invention were similar to the control, although some loss in impact strength was noted. However, a dramatic torque reduction, in excess of 20 percent, was obtained. As previously noted, it was unexpected that crosslinked CPVC compounds would result in such a torque reduction.

Table II sets forth a comparison of conventional CPVC resins to crosslinked CPVC resins of the present invention. Table III relates to blends of crosslinked CPVC with non-crosslinked CPVC resins.

TABLE II

| COMPARISON OF CONVENTIONAL CPVC RESIN TO CROSSLINKED CPVC | | | | | |
|---|---|---|---|---|---|
| | 1 | 2 | 3 | 4 | 5 |
| Base Resins | | | | | |
| PVC Type | Mass | Mass | Mass | Suspension | Mass Crosslinked |
| Inherent Viscosity | 0.68 | 0.76 | 0.84 | 0.92 | Apparent 0.74 |
| CPVC, % Cl$_2$ | 67 | 68 | 68 | 67 | 68 |
| Evaluation Recipe | | | | PHR | |
| CPVC Resin | | | | 100 | |
| MBS Impact Modifier | | | | 9 | |
| Chlorinated Polyethylene | | | | 3 | |
| Dibutyltin Bis-Isooctyl Thioglycolate | | | | 2 | |
| Oxidized Polyethylene | | | | 1.5 | |
| Fatty Acid Ester Wax | | | | 0.5 | |
| Titanium Dioxide | | | | 1 | |
| Test Results | | | | | |
| Dynamic thermal Stability | | | | | |
| Maximum Temperature, °F. | 433 | 443 | 448 | 441 | 438 |
| Stability Time, Minutes | 14.7 | 14.5 | 9.3 | 4.4 | 9.7 |
| Minimum Torque, Meter-Grams | 1900 | 2420 | 2720 | 3180 | 2190 |
| Notched Izod, Foot-Pounds/Inch (⅛ Inch Specimen) | 5.5 | 5.0 | 7.0 | 6.5 | 2.0 |
| Instron Capillry Rheometer | | | | | |
| Apparent Viscosity at 745 sec$^{-1}$, Poise | | | | | |
| 190° C. | 16,000 | 22,500 | 23,600 | 18,100 | 18,400 |
| 210° C. | 9,500 | 13,400 | 12,550 | 12,100 | 12,350 |
| 230° C. | 7,300 | 9,200 | 9,200 | 9,000 | 8,650 |
| Brabender Extrusion Life Test, Rating | 4 | 3 | 3 | 2 | 3 |

TABLE II-continued

| COMPARISON OF CONVENTIONAL CPVC RESIN TO CROSSLINKED CPVC | | | | | |
|---|---|---|---|---|---|
| | 1 | 2 | 3 | 4 | 5 |

(1 = Best, 5 = Worst)

TABLE III

| BLENDS OF CROSSLINKED CPVC WITH NON-CROSSLINKED CPVC | | | | | |
|---|---|---|---|---|---|
| | 1 | 2 | 3 | 4 | 5 |
| Evaluation Recipes | | | | | |
| 68% Cl₂ CPVC Resin | 75 | 75 | 75 | 60 | 85 |
| 63.5% Cl₂ CPVC Resin | 25 | — | — | — | — |
| 68% Cl₂ Crosslinked CPVC Resin | — | 25 | 25 | 40 | 15 |
| MBS Impact Modifier | 8.5 | 8.5 | 10 | 10 | 10 |
| Dibutyltin Bisisoctyl Thioglycolate | 2.5 | 2.5 | 2.5 | 2.5 | 2.5 |
| Acrylic Processing Aids | 3 | 3 | 3 | 3 | 3 |
| Oxidized Polyethylene | 1.5 | 1.5 | 1.5 | 1.5 | 1.5 |
| Fatty Acid Ester Wax | 1 | 1 | 1 | 1 | 1 |
| Titanium Dioxide | 5 | 5 | 5 | 5 | 5 |
| Test Results | | | | | |
| Notched Izod, Ft-Lbs/In. (⅛ Inch Specimen) | 7.9 | 2.0 | 2.7 | 2.4 | 5.8 |
| Variable Height | 1.76D | 1.56SB | 0.9B | 1.1SB | 0.9B |
| Brabender Extrusion Life Test, Rating (1 = Best, 5 = Worst) | 3 | 4 | 3 | 4 | 3 |

D = Ductile
SB = Semi-Brittle
B = Brittle

As apparent from Table II, the crosslinked CPVC resin resulted a dramatic reduction in the torque viscosity.

As apparent from Table III, the utilization of minor amounts of non-crosslinked CPVC resin with crosslinked CPVC resin did not hurt processability of the blend as noted by the Brabender Extrusion Life Test.

While in accordance with the Patent Statues, the best mode and preferred embodiment have been set forth, the scope of the invention is not limited thereto, but rather by the scope of the attached claims.

What is claimed is:

1. A crosslinked chlorinated polyvinyl chloride resin composition, comprising:
a crosslinked chlorinated polyvinyl chloride resin, said crosslinked chlorinated polyvinyl chloride resin containing from about 58 percent to about 70 percent by weight of chlorine therein, said crosslinked chlorinated polyvinyl chloride resin made from a vinyl chloride monomer and a crosslinking agent, said crosslinking agent containing two or more polymerizable $CH_2=C<$ groups per molecule, the composition containing from about 0 percent to about 85 percent by weight of a non-crosslinked chlorinated polyvinyl chloride resin based upon the total weight of said non-crosslinked chlorinated polyvinyl chloride resin and said crosslinked chlorinated polyvinyl resin, and containing from about 0 parts to about 40 parts by weight of a non-crosslinked polyvinyl chloride resin per 100 parts by weight of said non-crosslinked chlorinated polyvinyl chloride resin and said crosslinked chlorinated polyvinyl chloride resin, the amount of said crosslinking agent being from about 0.025 parts to about 5.0 parts by weight for every 100 parts by weight of said vinyl chloride monomer.

2. A crosslinked chlorinated polyvinyl chloride resin composition according to claim 1, wherein the amount of said non-crosslinked chlorinated polyvinyl chloride resin is from about 0 percent to about 50 percent by weight based upon the total weight of said non-crosslinked chlorinated polyvinyl chloride resin and said crosslinked chlorinated polyvinyl chloride resin, and wherein the amount of said non-crosslinked polyvinyl chloride is from about 0 parts to about 25 parts by weight per 100 parts by weight of said non-crosslinked chlorinated polyvinyl chloride and said crosslinked chlorinated polyvinyl chloride resin.

3. A crosslinked chlorinated polyvinyl chloride resin composition according to claim 2, wherein said crosslinking agent is a polyunsaturated-hydrocarbon, a polyunsaturated-polyester, a polyunsaturated-polyether, a polyunsaturated-nitrile, a polyunsaturated-acid anhydride, a polyunsaturated-ketone, a polyunsaturated-alcohol, and combinations thereof.

4. A crosslinked chlorinated polyvinyl chloride resin composition according to claim 3, wherein the amount of said crosslinking agent is from about 0.1 to about 2.0 parts by weight, and wherein said crosslinking agent is divinyl benzene, diallyl phthalate, or combinations thereof.

5. A crosslinked chlorinated polyvinyl chloride resin composition according to claim 4, wherein said composition contains said non-crosslinked chlorinated polyvinyl chloride resin, wherein the amount of said non-crosslinked chlorinated polyvinyl resin being from about 0 percent by weight to about 25 percent by weight based upon the total weight of said non-crosslinked chlorinated polyvinyl resin and said crosslinked chlorinated polyvinyl resin, and wherein the amount of said chlorination of said crosslinked chlorinated polyvinyl resin is from about 65 percent to about 69 percent by weight.

6. A crosslinked chlorinated polyvinyl chloride resin composition according to claim 1, wherein said crosslinked chlorinated polyvinyl chloride resin is made from said vinyl chloride monomer and a vinyl component comonomer, wherein the amount of said crosslinking agent is based upon 100 parts by weight of said vinyl chloride monomer and said vinyl component comonomer, said vinyl component comonomer being an ester of acrylic acid wherein said ester portion contains from 1 to 12 carbon atoms, vinyl acetate, an ester of methacrylic acid wherein said ester portion contains from 1 to 12 carbon atoms, styrene or a styrene derivative having a total of from 8 to 15 carbon atoms, vinyl naphthalene, a diolefin having a total of from 4 to 8 carbon atoms, a monoolefin having from 2 to 10 carbon atoms, and combinations thereof, and wherein the amount of said vinyl component comonomer is such to produce a copolymer containing from about 5 percent to about 30 percent by weight of vinyl component repeating units therein.

7. A crosslinked chlorinated polyvinyl chloride resin composition according to claim 2, wherein said crosslinked chlorinated polyvinyl chloride resin is made from said vinyl chloride monomer and a vinyl component comonomer, wherein the amount of said crosslinking agent is based upon 100 parts by weight of said vinyl chloride monomer and said vinyl component comonomer, said vinyl component comonomer being an ester of acrylic acid wherein said ester portion contains from 1 to 12 carbon atoms, styrene or a styrene derivative having a total of from 8 to 15 carbon atoms, vinyl naphthalene, a diolefin having a total of from 4 to 8 carbon atoms, a monoolefin having from 2 to 10 carbon atoms, and combinations thereof, and wherein the amount of said vinyl component comonomer is such to produce a copolymer containing from about 5 percent to about 30 percent by weight of vinyl component repeating units therein.

8. A crosslinked chlorinated polyvinyl chloride resin composition according to claim 3, wherein said crosslinked chlorinated polyvinyl chloride resin is made from said vinyl chloride monomer and a vinyl acetate comonomer, wherein the amount of said crosslinking agent is based upon 100 parts by weight of said vinyl chloride monomer and said vinyl acetate comonomer, wherein the amount of said vinyl acetate comonomer is such to produce said copolymer having from about 7 percent to about 20 percent by weight of vinyl acetate repeating units therein.

9. A crosslinked chlorinated polyvinyl chloride resin composition according to claim 4, wherein said crosslinked chlorinated polyvinyl chloride resin is made from said vinyl chloride monomer and a vinyl acetate comonomer, wherein the amount of said crosslinking agent is based upon 100 parts by weight of said vinyl chloride monomer and said vinyl acetate comonomer, wherein the amount of said vinyl acetate is such to produce said copolymer having from about 7 percent to about 20 percent by weight of vinyl acetate repeating units therein.

10. A crosslinked chlorinated polyvinyl chloride resin composition according to claim 5, wherein said crosslinked chlorinated polyvinyl chloride resin is made from said vinyl chloride monomers and a vinyl acetate comonomer, wherein the amount of said crosslinking agent is based upon 100 parts by weight of said vinyl chloride monomer and said vinyl acetate comonomer, wherein the amount of said vinyl acetate is such to produce said copolymer having from about 7 percent to about 20 percent by weight of vinyl acetate repeating units therein.

11. A crosslinked chlorinated polyvinyl chloride resin composition, comprising:
a chlorinated polyvinyl chloride resin containing from about 58 percent to about 70 percent by weight of chlorine therein, said chlorinated polyvinyl chloride resin crosslinked with an effective amount of a crosslinking agent so that the composition has reduced processing torque, said crosslinking agent containing two or more polymerizable $CH_2=C<$ groups per molecule.

12. A crosslinked chlorinated polyvinyl chloride resin composition according to claim 11, including from about 0 percent to about 85 percent by weight of a non-crosslinked chlorinated polyvinyl chloride resin based upon the total weight of said crosslinked chlorinated polyvinyl chloride resin and said non-crosslinked chlorinated polyvinyl chloride resin, and including from about 0 parts to about 45 parts by weight of a non-crosslinked polyvinyl chloride resin per 100 parts by weight of said crosslinked chlorinated polyvinyl chloride resin and said non-crosslinked chlorinated polyvinyl chloride resin, and wherein said reduced processing torque of said composition is at least 5 percent.

13. A crosslinked chlorinated polyvinyl chloride resin composition according to claim 12, wherein said crosslinked chlorinated polyvinyl chloride resin is made from a vinyl chloride monomer and a vinyl component comonomer, said vinyl component comonomer being an ester of acrylic acid wherein said ester portion contains from 1 to 12 carbon atoms, vinyl acetate, an ester of methacrylic acid wherein said ester portion contains from 1 to 12 carbon atoms, styrene or a styrene derivative having a total of from 8 to 15 carbon atoms, vinyl naphthalene, a diolefin having a total of from 4 to 8 carbon atoms, a monoolefin having from 2 to 10 carbon atoms, and combinations thereof, and wherein the amount of said vinyl component comonomer is such to produce a copolymer containing from about 5 percent to about 30 percent by weight of vinyl component repeating units therein.

14. A crosslinked chlorinated polyvinyl chloride resin composition according to claim 12, wherein said non-crosslinked chlorinated polyvinyl chloride resin is from about 0 percent to about 50 percent by weight based upon the total weight of said non-crosslinked chlorinated polyvinyl chloride resin and said crosslinked chlorinated polyvinyl chloride resin, and wherein the amount of said non-crosslinked polyvinyl chloride is from about 0 parts to about 25 parts by weight per 100 parts by weight of said non-crosslinked chlorinated polyvinyl chloride and said crosslinked chlorinated polyvinyl chloride resin, and wherein said reduced processing torque of said composition is at least 10 percent.

15. A crosslinked chlorinated polyvinyl chloride resin composition according to claim 14, wherein said crosslinking agent is a polyunsaturated-hydrocarbon, a polyunsaturated-polyester, a polyunsaturated-polyether, a polyunsaturated-nitrile, a polyunsaturated-acid anhydride, a polyunsaturated-ketone, a polyunsaturated-alcohol, and combinations thereof, wherein said composition contains said crosslinked chlorinated polyvinyl chloride resin and said non-crosslinked chlorinated polyvinyl chloride resin, and wherein the amount of said non-crosslinked chlorinated polyvinyl chloride resin is from about 0 percent to about 25 percent by weight based upon the total weight of said crosslinked chlorinated polyvinyl chloride resin and said non-crosslinked chlorinated polyvinyl chloride resin, wherein said crosslinked chlorinated polyvinyl chloride resin is made from a vinyl chloride monomer, and wherein the amount of said effective amount of said crosslinking agent is from about 0.25 to about 5.0 parts by weight for every 100 parts by weight of said vinyl chloride monomer.

16. A crosslinked chlorinated polyvinyl chloride resin composition according to claim 15, wherein said crosslinking agent is diallyl phthalate, divinyl benzene, or combinations thereof, wherein the amount of said crosslinking agent is from about 0.1 to about 2.0 parts by weight, and wherein the amount of chlorination of said crosslinked chlorinated polyvinyl chloride resin contains from about 65 percent to about 69 percent by weight of chlorine therein.

* * * * *